United States Patent

Ronen

[11] Patent Number: 6,026,441
[45] Date of Patent: Feb. 15, 2000

[54] METHOD FOR ESTABLISHING COMMUNICATION ON THE INTERNET WITH A CLIENT HAVING A DYNAMICALLY ASSIGNED IP ADDRESS

[75] Inventor: Yzhak Ronen, West Windsor, N.J.

[73] Assignee: AT&T Corporation, New York, N.Y.

[21] Appl. No.: 08/991,398

[22] Filed: Dec. 16, 1997

[51] Int. Cl.[7] .................................................. G06F 15/16
[52] U.S. Cl. ........................................ 709/227; 709/235
[58] Field of Search .................................... 709/203, 201, 709/224, 250, 221, 227, 228, 235; 370/401, 400, 402, 410, 408, 409

[56] References Cited

U.S. PATENT DOCUMENTS 5,790,548  8/1998  Sistanizadeh et al. ................... 370/401
5,793,763  8/1998  Mayes et al. ............................ 370/389

OTHER PUBLICATIONS

Man Page for Figer Command http://www.geckil.com/~harvest/tcpip–docs/Finger.html, No Date.

*Primary Examiner*—Mehmet B. Geckil

[57] ABSTRACT

A connection is established on the Internet between an originating client terminal and a destination client terminal, the latter having an IP address which has been dynamically assigned by an Internet Access Service Provider (IASP) and which is unknown to the originating client terminal. Using a known e-mail address associated with a user of the destination client terminal, which e-mail address includes a name associated with the user and the domain name associated with the IASP, which both provides access to the Internet and e-mail service to the user, the IP address that IASP is determined from a Domain Name Server (DNS) on the Internet. The IASP is then queried at that address to determine whether the user with the known name is currently logged on. If that user is logged on, the IP address assigned by the IASP to the destination client terminal is provided to the originating client terminal and a connection is then established to the destination client terminal at the provided IP address.

19 Claims, 2 Drawing Sheets

METHOD FOR ESTABLISHING COMMUNICATION ON THE INTERNET WITH A CLIENT HAVING A DYNAMICALLY ASSIGNED IP ADDRESS

TECHNICAL FIELD

This invention relates to the Internet, and more specifically, to a method for establishing a connection on the Internet between applications associated with two or more client terminals.

BACKGROUND OF THE INVENTION

When the user of a client terminal connected to the Internet wants to access the information or services offered by service providers on the Internet, the client terminal initiating the connection to the service provider's server needs to identify that server by its Internet Protocol (IP) address (e.g., 123.456.78.9), or by its Internet name (e.g., host.ab.att.com), or as more recently known to the public at large, by its URL that includes an address (e.g., www.host.ab.att.com). A special server, called a domain name server (DNS) is used, as part of the Internet protocol specifications, to map such Internet names to actual IP addresses. There is a non-ambiguous one-to-one mapping function between each name and its associated IP address. In order for such mapping functionality to take place, the IP address of at least one DNS must be known to the application program, such as a Web browser running on the client terminal, which may use the same DNS IP address for each name-to-address mapping lookup. Once the client terminal obtains the IP address of the server with which it wants to interact, a connection is established between the client application and that server application at that IP address. Thus, when a client terminal wants to obtain information or a service from a Web server with a known Internet name on the Internet, the Web browser running on the client terminal transmits that Internet name to the DNS, obtains the IP address associated with that Internet name, and establishes a connection with the Web server at that IP address in order to receive that server's web page.

A connection can also be established on the Internet between two client applications on client terminals if the client terminal initiating the connection knows the IP address of the client terminal at the terminating end of the connection. Each client terminal communicating on the Internet has an IP address assigned to it. This IP address may be a static address that is assigned to the communicating party and remains with that party for a long period of time. Alternatively, a temporary IP address may be dynamically assigned to a client terminal for use for only a short period of time. Generally, when the user of a client terminal accesses the Internet through an Internet Access Service Provider (IASP), the client terminal is assigned an IP address for use only during the user's current session. At the end of that session, the IP address assigned to that client terminal is assigned by the IASP to another client terminal when it establishes a connection with the IASP. Thus, the IASP need not have as many IP addresses as it has customers since only a fraction of its customers are simultaneously connected to it.

SUMMARY OF THE INVENTION

In accordance with the present invention, a connection to a client terminal, which is dynamically assigned a IP address each time its user logs onto the Internet, is established without needing to know a priori the IP address temporarily assigned to that client terminal. Such a connection can be established for a plurality of different purposes such as Internet Telephony, teleconferencing, etc. Specifically, an initiating first user at a client terminal who wishes to establish a connection over the Internet with a destination user's client terminal uses the destination user's e-mail address (mary@def.com) to determine the domain name of that user's IASP (def.com). Using that determined domain name of the destination user's IASP, a DNS is queried to obtain the IP address of that IASP. The client terminal of the initiating user then sends a query to that IASP's IP address to obtain the IP address that that IASP has currently assigned to the destination user (mary). If that second user is logged on, an entry will exist in a database at the destination user's IASP that associates that user (mary) with the IP address assigned by the IASP to that user's client terminal for the current session. If an entry does not exist, the destination user (mary) is not currently logged on. The dynamic IP address assigned to that second user's client terminal or the fact that that user is not currently logged on is communicated back to the initiating user's client terminal. If the destination user is logged on, the application running on the initiating user's client terminal then establishes a connection over the Internet to the destination user's client terminal using its determined IP address.

DETAILED DESCRIPTION

Figure 1:
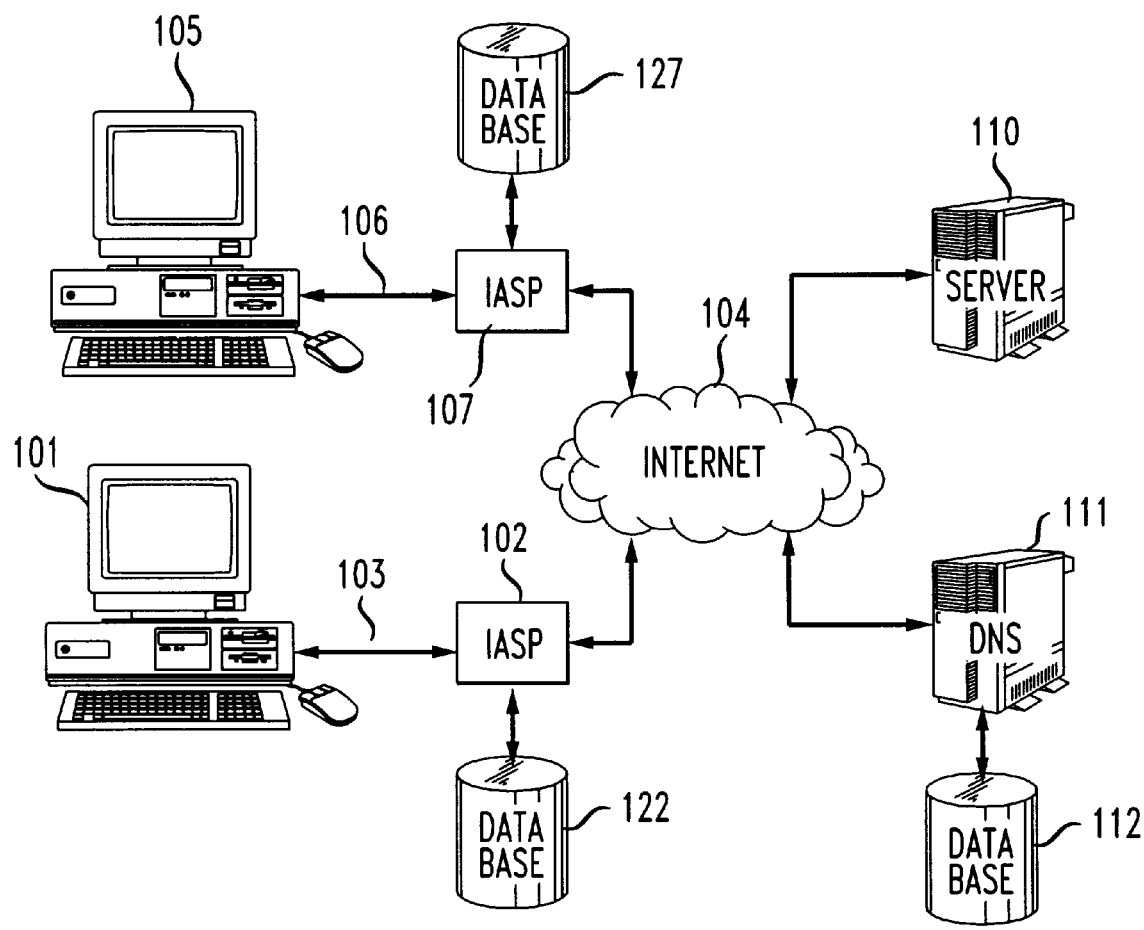
FIG. 1 is a block diagram showing how an initiating user at a first client terminal establishes a connection over the Internet with a destination user at a second client terminal in accordance with the present invention.

With reference to FIG. 1, a client terminal 101 is connected to the IASP 102 to which the user of terminal 101 subscribes. The connection 103 between terminal 101 and IASP 102 can be, for example, on a plain old telephone service (POTS) connection through that first user's Local Exchange Carrier (LEC) (not shown) using a voice-band modem, on a cable connection using a cable modem, directly over a Local Area Network (LAN), or via any other type of connection that provides access to the Internet 104 to that user through that IASP's point of presence (PoP) on the Internet. In a similar manner, a second client terminal 105 is connected via connection 106 to the IASP 107 to which the user of the second terminal subscribes. As with client terminal 101, client terminal 105 can be connected to IASP 107 on a POTS connection through a LEC, a cable connection, through a LAN, or any other type of connection. IASP 107 is also connected to the Internet 104.

When the user of client terminals 101 logs onto the Internet through IASP 102, and provides his or her identity through a logon and identification procedure, client terminal 101 is assigned a temporary IP address that is used for the current session. Thus, a database 122, associated with IASP 102, stores a mapping of each client terminal then connected to IASP 102 and its user, and the IP address assigned to that terminal. Similarly, a database 127, associated with IASP 107, stores the mapping of each client terminal then connected to IASP 107 and its user, and the IP address assigned to that terminal. Thus, by accessing its associated database, IASPs 102 and 107 can determine whether a particular one of its subscribers is currently logged on. When the user of a client terminal ends his or her current session, the IP address assigned to that user's client terminal is made available for use by a user at another client terminal who subsequently logs onto the Internet through the same IASP.

For purposes of the present invention, it is assumed that the users of client terminals 101 and 105 are also subscribers of an e-mail service through their respective IASPs 102 and 107, respectively. As a subscriber to an e-mail service, e-mail messages to a subscriber are addressed in the form of name@domain_name, where "name" identifies the particular addressee subscriber user and "domain_name" identifies the IASP through which "name" is associated. Thus if "john" is a subscriber with IASP 102, which has a domain name abc.com, e-mail for to "john" is addressed to john@abc.com. Similarly, if "mary" is a subscriber with IASP 107, which has a domain name def.com, e-mail for "mary" is addressed to mary@def.com. When "john" logs onto the Internet through IASP 102 through client terminal 101, he can thus retrieve e-mail messages directed to him. Similarly, when "mary" logs onto the Internet through IASP 107 through client terminal 105, she can retrieve the e-mail messages directed to her. Further, as noted above, when "John" and "mary" log onto the Internet through IASPs 102 and 107, respectively, databases 122 and 127 record the IP address assigned to the associated client terminals and the identity of the user.

Once the user, "john", of client terminal 101 logs onto the Internet through IASP 102, in a typical browsing scenario "john" will use his browser program to retrieve a Web object stored in a server 110, as well as at a plurality of other servers (not shown) connected to the Internet. In "surfing the Net", "john" inputs the URL domain name of the server 110 to which he desires to establish a connection, as for example xyz.com. In order to establish a connection to server 110, the browser program first determines the actual IP address associated with that URL domain name. The browser program in client terminal 101 thus first contacts a Domain Name Server (DNS) 111 at a predefined IP address. A database 112 associated with DNS 111 then maps the domain name xyz.com to an actual IP address, which IP address is returned to the browser program in client terminal 101. A connection is then established between client terminal 101 and server 110.

When the user, "john", of client terminal 101 wants to initiate an application, such as Internet telephony, or Internet teleconferencing, which requires establishing a connection over the Internet with a user, "mary", at another client terminal 105, the IP address of client terminal 105 cannot be provided by DNS 111 since DNS 111 does not have a record of temporary IP address assignments. In accordance with the present invention, the user, "john" of client terminal 101 identifies the party, "mary", with whom he wishes to establish a connection with that party's e-mail address, mary@def.com. The application then sends a query to DNS 111 to obtain the IP address for the IASP associated with def.com, which is returned to the application running on client terminal 101. Upon receipt of that IP address, which for this example is the IP address of IASP 107, the application sends a query to IASP 107 at its determined IP address requesting the IP address associated with mary@def.com. If "mary" is logged on to the Internet through IASP 107, an entry exists in database 127 for "mary", which entry indicates the IP address then currently assigned to "mary" for her then current session. IASP 107 thus responds to the query sent by the application running on client terminal 101 with the IP address for mary@def.com. If, on the other hand, an entry does not exist for "mary", then she is not currently logged on and the application running on client terminal 101 is so notified. Once the actual IP address of "mary" is determined and provided to the application running on client terminal 101, the application can connect to client terminal 105, thereby establishing a direct connection through the Internet between client terminal 101 and client terminal 105.

Figure 2:
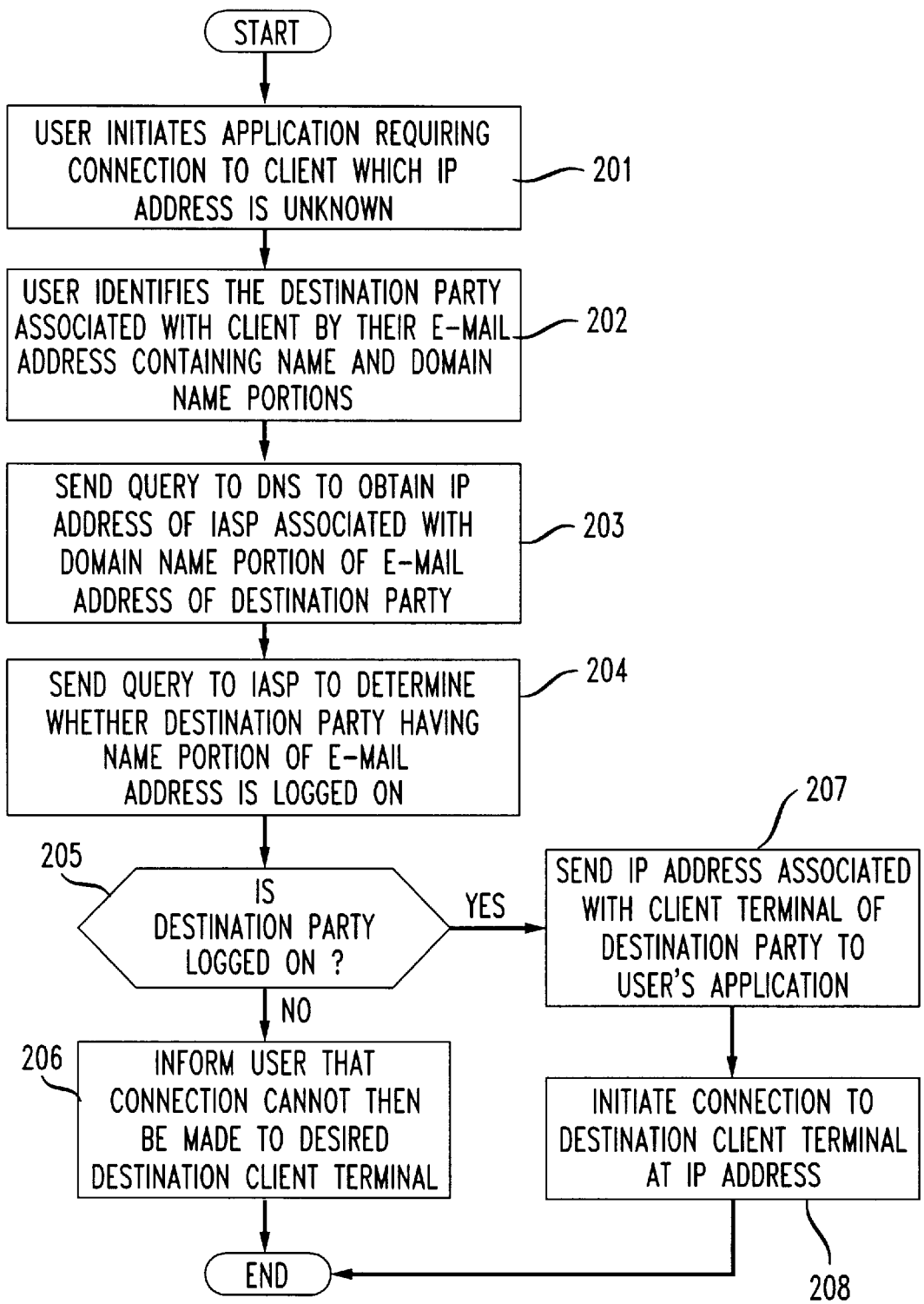
FIG. 2 is a flowchart detailing the steps of the present invention.

FIG. 2 shows the steps of the present invention. At step 201, the user initiates on his or her client terminal an application requiring a connection to a second client terminal which IP address is unknown. At step 202, the user identifies the party associated with the second client terminal by that party's e-mail address. At step 203, the application sends a query to the DNS to get the IP address of the IASP associated with the domain name portion of the e-mail address. At step 204, after receiving the IP address of that IASP, the application sends a query to that IASP to determine whether an entry exists in a database that associates user names with currently assigned IP addresses. At decision step 205, a determination is made whether such entry does exist. At step 206, if no entry exists, the application is informed that it cannot connect to the desired endpoint. At step 207, if an entry does exist, the IP address associated with that name portion is sent to the application. At step 208, the application connects to the second client terminal.

Although described in conjunction with the connection of an originating client terminal to a destination client terminal for an application such as Internet telephony or conferencing, the present invention can be used for any type of application in which a connection needs to be established on the Internet or any other computer network to an endpoint which address is unknown to the originating client terminal or other originating terminus, while using the same e-mail address for all applications.

In the previously described Internet telephony application, the e-mail address of the destination party is used to determine whether he or she is currently logged onto the Internet, and if so, the dynamic IP address currently assigned to his or her client terminal. For an Internet conferencing application involving a plurality of participants, the e-mail address of each conferee is used to determine whether each is logged on and their respective dynamic IP address.

The use of the e-mail address to determine the dynamic IP address of a user can be extended to include an application identifier that is used when querying the domain associated with e-mail address. Thus, once the IP address of the domain is determined by the DNS, and the IASP at that domain is queried, that query to the IASP includes an application ID that identifies a specific application for which the connection is being established. When that query is sent to the IASP identified by the domain_name, that IASP has a table in an associated database that identifies another IASP that holds the dynamic address of the end user for that identified application. More specifically, the originating client initially contacts the domain IASP of name@domain_name, providing "name" and the application ID. The IASP domain-name keeps a current table of the dynamic addresses for all applications that it itself is running. Users may, however, also subscribe to another IASP, IASP2, because the latter has a fast access network. IASP2 will notify the original IASP at domain_name that, for the purpose of a specific application such as video teleconferencing, IASP2 will know the current dynamic IP address of that user, "name". When domain_name receives a request regarding the video application, it will look up its own table to find the appropriate IASP, in this case IASP2, that provides the current dynamic IP address for video teleconferencing. The original IASP, domain_name, then contacts IASP2, retrieves the current IP address of the destination client, and notifies the originating client. The current IP address of the destination party may be delivered by IASP2 directly to the original IASP, domain_name, or by chaining where a chain exists that helps other IASPs deliver the current IP address of a destination party to the original IASP. Further, the second IASP, IASP2, does not have to notify the original IASP. Rather, a protocol can exist whereby the original IASP, domain_name, sends a query to the Internet that travels by various IASPs until it gets to an IASP that knows the mapping for a specific name@doman_name+application_ ID to a dynamic IP address. Once found, that dynamic address is send back to the originating client.

The above-described embodiments are illustrative of the principles of the present invention. Other embodiments could be devised by those skilled in the art without departing from the spirit and scope of the present invention.

The invention claimed is:

1. A method of establishing on a computer network a connection for an application from an originating terminus to a destination endpoint comprising the steps of:

using a known e-mail address associated with a user at the destination endpoint or with the endpoint, determining an address on the computer network of a server connected to the computer network that provides to the endpoint access to the computer network;

determining whether the endpoint is connected to the computer network;

if the endpoint is determined to be connected to the computer network, determining an address associated with the endpoint on the computer network; and establishing a connection over the computer network to the endpoint at the determined address for the application.

2. The method of claim 1 further comprising the step of: if the endpoint is determined not to be connected to the computer network, sending the originating terminus information that a connection cannot be made to the endpoint.

3. The method of claim 1 wherein the computer network is the Internet.

4. The method of claim 3 wherein the address of the endpoint is an Internet Protocol (IP) address.

5. The method of claim 4 wherein the server is an Internet Access Server Provider.

6. The method of claim 5 wherein the endpoint is a client terminal.

7. The method of claim 5 wherein the originating terminus is a client terminal.

8. The method of claim 1 wherein the address associated with the endpoint is dynamically assigned to the endpoint by the server for temporary use by the endpoint during a session on the computer network by a user at that endpoint.

9. A method of establishing a connection for an application on an Internet Protocol (IP) computer network to a destination client terminal which has an IP address that is unknown to an originating client terminal, the method comprising the steps of:

using a known e-mail address associated with a user of the destination client terminal or with the destination client terminal, determining an IP address on the computer network of a server connected to the computer network that provides to the destination client terminal access to the computer network;

determining whether the destination client terminal is presently connected to the computer network;

if the destination client terminal is determined to be presently connected to the computer network, determining an IP address associated with the destination client terminal on the IP computer network; and establishing a connection over the IP computer network to the destination client terminal at the determined IP address for the application.

10. The method of claim 9 further comprising the step of: if the destination client terminal is determined not to be presently connected to the computer network, sending the originating client information that a connection cannot then be made to the destination client terminal.

11. The method of claim 9 wherein the computer network is the Internet.

12. The method of claim 11 wherein the server is an Internet Access Service Provider (IASP).

13. The method of claim 12 wherein the IP address of the destination client terminal is dynamically assigned to the destination client terminal by the IASP for temporary use by the destination client terminal during a session on the computer network by a user at that destination client terminal.

14. A method of establishing a connection for an application from an originating client terminal on an Internet Protocol (IP) computer network to a destination client terminal which has an IP address that is dynamically assigned to the destination client terminal by an access provider to the computer network and which IP address is unknown to the originating client terminal, the method comprising the steps of:

using a known e-mail address associated with a user of the destination client terminal or with the destination client terminal and which address comprises a name associated with the user and a domain name associated with the access provider, determining an IP address associated with the access provider;

using the name associated with the user of the destination client terminal, determining whether the user's destination client terminal is currently logged on at the access provider at its determined IP address;

if the user's destination client terminal is determined to be presently logged on, determining the IP address assigned by the access provider to the destination client terminal; and establishing a connection for the application over the IP computer network to the destination client terminal at the determined IP address.

15. The method of claim 14 further comprising the step of: if the destination client terminal is determined not to be presently connected to the computer network, sending the originating client information that a connection cannot then be made to the destination client terminal.

16. The method of claim 14 wherein the computer network is the Internet.

17. The method of claim 16 wherein the server is an Internet Access Service Provider (IASP).

18. A method of establishing on a computer network a connection for an application from an originating terminus to a destination endpoint comprising the steps of:

using a known e-mail address associated with a user at the destination endpoint or with the endpoint, determining an address on the computer network of a first server connected to the computer network that provides to the endpoint access to the computer network;

determining from an identification of the application, an address on the computer network of a second server connected to the computer network that provides to the endpoint access to the computer network for that identified application;

determining whether the endpoint is connected to the computer network through the determined second server for the application;

if the endpoint is determined to be connected to the computer network for the application, determining an address associated with the endpoint on the computer network; and establishing a connection over the computer network to the endpoint at the determined address for the application.

19. A method of establishing a connection for an application on an Internet Protocol (IP) computer network to a destination client terminal which has an IP address that is unknown to an originating client terminal, the method comprising the steps of:

using a known e-mail address associated with a user of the destination client terminal or with the destination client terminal, determining an IP address on the computer network of a first server connected to the computer network that provides to the destination client terminal access to the computer network:

determining from an identification of the application, an IP address on the computer network of a second server connected to the computer network that provides to the destination client terminal access to the computer network for that identified application;

determining whether the destination client terminal is presently connected to the computer network through the determined second server for the application;

if the destination client terminal is determined to be connected to the computer network for the application, determining an IP address associated with the destination client terminal on the IP computer network; and establishing a connection over the IP computer network to the destination client terminal at the determined IP address for the application.

* * * * *